United States Patent [19]

Frawley, Jr.

[11] Patent Number: 5,024,084
[45] Date of Patent: Jun. 18, 1991

[54] FLOW METER FOR LIQUID DOCTORED THROUGH FOURDRINIER FABRIC AT WET END OF FOURDRINIER PAPER MACHINE

[75] Inventor: Thomas E. Frawley, Jr., Appleton, Wis.

[73] Assignee: Appleton Specialty Products, Inc., Appleton, Wis.

[21] Appl. No.: 432,165

[22] Filed: Nov. 6, 1989

[51] Int. Cl.⁵ .............................................. G01F 1/20
[52] U.S. Cl. ..................................... 73/215; 162/198
[58] Field of Search .................. 73/215, 216; 162/198, 162/253

[56] References Cited

U.S. PATENT DOCUMENTS

| | | |
|---|---|---|
| 802,901 | 10/1905 | Yabsley et al. ........................ 73/215 |
| 1,056,178 | 3/1913 | Humphrey . |
| 1,143,344 | 6/1915 | Yarnall . |
| 1,161,279 | 11/1915 | Anderson .............................. 73/215 |
| 1,193,613 | 8/1916 | Riegler . |
| 1,505,050 | 8/1924 | Lauritsen . |
| 1,520,873 | 12/1924 | Lauritsen . |
| 1,710,474 | 4/1929 | Dodd . |
| 2,346,746 | 4/1944 | Green . |
| 2,579,226 | 12/1951 | Cram . |
| 2,596,724 | 5/1952 | Reynolds . |
| 3,086,005 | 4/1963 | Richardson . |
| 3,301,050 | 1/1967 | McNulty ............................... 73/215 |
| 3,330,151 | 7/1967 | Reinhall . |
| 3,619,360 | 11/1971 | Persik . |
| 3,705,078 | 12/1972 | Shinohara . |
| 3,871,231 | 3/1975 | Ciarico ................................ 73/215 |
| 3,934,472 | 1/1976 | Bradham . |
| 3,954,009 | 5/1976 | Lederer . |
| 3,996,798 | 12/1976 | Heyden . |
| 4,195,520 | 4/1980 | Shaver ................................. 73/215 |
| 4,213,336 | 7/1980 | Schweickart et al. ................ 73/215 |
| 4,353,251 | 10/1982 | Spears . |
| 4,406,159 | 9/1983 | Yanishevsky . |
| 4,455,870 | 6/1984 | Jorritsma . |
| 4,669,308 | 6/1987 | Jorritsma . |

*Primary Examiner*—Herbert Goldstein
*Attorney, Agent, or Firm*—Fuller, Ryan & Hohenfeldt

[57] ABSTRACT

A testing device for determining the amount of liquid having been doctored through the Fourdrinier fabric or wire at the wet end of a Fourdrinier-type paper machine. Included is a pick-up for insertion beneath the foil blades of the paper machine, having an opening for insertion into the stream of the liquid being doctored from the pulp. A container is connected in liquid communication with the pick-up. A weir is positioned within the container to divide the container into a collection well upstream from the weir and a discharge well downstream from the weir. The container includes a still well positioned in liquid communication with the collection well. A proximity sensor is provided, and positioned with respect to the still well to sense the level of liquid in the still well. A microprocessor controlled display is provided for receiving a signal from the proximity sensor and displaying a flow rate based on the level of the liquid in the still well. The size and shape of the weir opening, and of the pick-up opening, are adjustable to bring the flow rate through the device into a suitable range for purposes of the display.

8 Claims, 1 Drawing Sheet

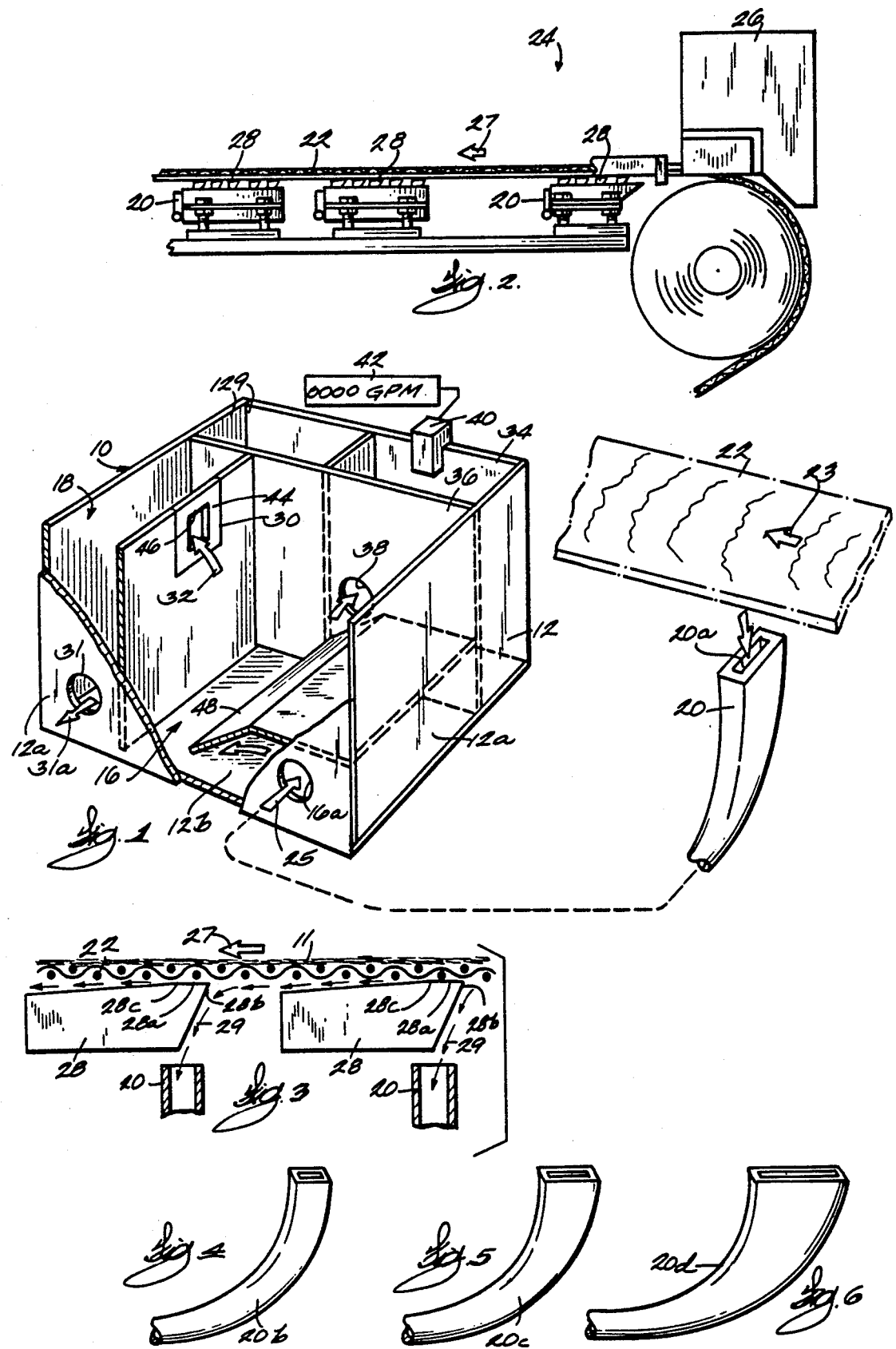

FLOW METER FOR LIQUID DOCTORED THROUGH FOURDRINIER FABRIC AT WET END OF FOURDRINIER PAPER MACHINE

BACKGROUND OF THE INVENTION

This invention relates to apparatus for attachment to Fourdrinier-type paper machines, and in particular to flow meters for measuring the liquid removed from the pulp, through the Fourdrinier fabric, or wire, at the wet end of a paper machine.

Generally it is known how much water and other liquid is jetted from the headbox onto the Fourdrinier fabric at the wet end of a paper machine, along with the pulp. This liquid is then removed from the pulp by foil blades positioned beneath a wire screen or Fourdrinier fabric, downstream from the headbox. The amount of the liquid removed becomes progressively less as the distance from the headbox increases. It is useful to know how much liquid is being removed at any particular position along the Fourdrinier fabric. This can be determined by measuring the rate of flow of the liquid being removed, knowing the amount of liquid jetted onto the Fourdrinier fabric from the headbox in the first place.

This invention relates to solutions to the problems referred to above.

SUMMARY OF THE INVENTION

The invention comprises a testing device for determining the amount of liquid having been doctored from the pulp at the wet end of a Fourdrinier-type paper machine by the foil blades. The testing device includes a pick-up means for insertion beneath the foil blades of the paper machine, having an opening therein for collecting some of the liquid being doctored from the pulp. A container is connected in liquid communication with the pick-up means. A weir is positioned within the container to divide the container into a collection well upstream from the weir and a discharge well downstream from the weir. The container includes a still well positioned in liquid communication with the collection well. Sensing means are provided, and positioned with respect to the still well to sense the level of liquid in the still well. Microprocessor controlled display means are provided for receiving a signal from the sensing means and displaying a flow rate based on the level of the liquid in the still well. Return means, in liquid communication with the discharge well and the area of the paper machine beneath the foil blades, are provided for returning the liquid to that area after use in the device. Baffle means are positioned within the collection well for reducing agitation of the liquid caused by the liquid entering the collection well at a high rate of flow. Sensing means may include an ultrasonic proximity sensor positioned proximal to the top of the still well for sensing the level of liquid within the still well and sending a signal indicating the level to the display means. The testing device includes means for adjusting the size and shape of the weir opening provided thereby.

Other objects and advantages of the invention will become apparent hereinafter.

DESCRIPTION OF THE DRAWING

FIG. 1 is an isometric view, partially schematic, of a testing device constructed according to a preferred embodiment of the invention.

FIG. 2 is a side view of the wet end of a Fourdrinier-type paper machine, showing a pickup of the testing device being used according to the invention.

FIG. 3 is a view similar to FIG. 2 except on an enlarged scale to show more detail of the invention.

FIGS. 4, 5 and 6 are isometric views of pick-ups of different sizes according to the invention.

DESCRIPTION OF THE PREFERRED EMBODIMENT

Referring now to FIG. 1, there is shown a testing device 10 for determining the flow of liquid having been doctored from the pulp 11 through the wire or Fourdrinier fabric 22 at the wet end of a Fourdrinier-type paper machine. As shown there, the device 10 includes a container 12 of a suitable size as will be explained more fully below. The container 12 may be generally a rectangular solid in shape. The container 12 comprises at least three, and preferably four, side walls 12a, all affixed to a base 12b.

Positioned within the container 12 is a weir plate 14, which divides the container into a collection well 16 and a discharge well 18. The collection well 16 is connected, via an opening 16a in a side wall 12a, to a pick-up 20 positioned beneath the Fourdrinier fabric 22 of a Fourdrinier-type paper machine. The pick-up 20 necessarily includes an opening 20a in the upper surface thereof, for receiving liquid having passed through the Fourdrinier fabric 22. If the direction of movement of the Fourdrinier fabric 22 is in the direction indicated by arrow 23, the opening 20a is a rectangular opening having its greater dimension in the cross machine direction, and its lesser dimension in the machine direction. By this means liquid is permitted to pass from beneath the Fourdrinier fabric 22 into the collection well 16, as indicated by arrow 25.

An example of a portion of a Fourdrinier-type paper machine 24 is shown in FIGS. 2 and 3. Conventionally such a paper machine includes a headbox 26 which holds a solution of pulp 11 in water. The pulp 11 is jetted onto the Fourdrinier fabric 22, in effect an endless belt the top flight of which is continually moving away from the headbox 26 as indicated by arrow 27.

As shown best in FIG. 3, conventionally the liquid portion of the pulp 11 is drawn or "doctored" through the Fourdrinier fabric 22 by foil blades 28 positioned just beneath the fabric. The upper surface 28a of the foil blade 28, near the leading edge 28b thereof, is generally level and conforms closely to the underside of the upper flight of the Fourdrinier fabric 22. The upper surface of foil blade 28 is then angled downward at 28c, away from the underside of the fabric 22. This angled surface 28c has a hydrofoil effect, drawing the water from the pulp 11 down through the Fourdrinier fabric. Hence the name "foil" blades 28. The water, once drawn through the fabric 22, though, clings to the underside of the fabric. The next foil blade 28, having the same shape, then presents a leading edge 28b which in effect shaves the water from the underside of the fabric 22. This action of the foil blades 28 results in a stream 29 of water 0.1 to 0.4 inches thick measured in the machine direction, the length of this stream being about the same as the entire width of the Fourdrinier fabric 22. As indicated above, since it is useful to know how much liquid is being doctored through the fabric 22 at any particular point along the fabric, the pick-up 20 is positioned beneath the foil box or boxes 33 (FIG. 2) where that determination is desired to be made.

As also indicated above, the amount of liquid doctored from the pulp 11 is relatively greater near the headbox 26, and relatively less at greater distances from the headbox. For this reason, the invention provides for pick-up means the size of which is variable or adjustable, depending upon the position along the fabric 22 that the particular pick-up is to be used. Accordingly, the most preferred embodiment of the present invention provides for pick-ups 20b, 20c and 20d of different sizes as shown respectively in FIGS. 4, 5 and 6. As shown in those drawing figures, the pick-up 20b, having the smallest opening, would be used nearest the headbox 26 (FIG. 2), the pick-up 20d with the largest opening would be used farthest from the headbox, and the pick-up 20c having the intermediate opening would be used at an intermediate distance. As an example, the long dimension of the largest opening 20d may be four inches, the long dimension of the intermediate opening 20c two inches and the long dimension 20b one inch, while the short dimension of each of the three openings would be about ⅜ inch, in order to catch the majority of the stream 29 (FIG. 3).

The weir plate 14 includes opening means 30 for permitting the flow of liquid from the collection well 16 to the discharge well 18, as indicated by arrow 32. That is, the overall height of the weir plate 14 is preferably substantially the same as the height of the side walls 12a. The weir plate 14 includes, however, an area 30 where the height of the weir plate 14 is somewhat lower. Through this opening means 30, when the amount of liquid in the collection well 16 is sufficient, the liquid from the collection well 16 spills into the discharge well 18. In order for the liquid to overflow the opening means 30, of course, the liquid must be somewhat, though slightly, higher than the lowest level of the opening means 30. It is axiomatic that the amount by which the level of the liquid in the collection well exceeds the level of the opening means 30 is directly related to the flow rate of the liquid through the device 10.

Once the liquid passes over the weir plate 14 and enters the discharge well 18, it is permitted to be discarded, or alternatively to be returned to the area beneath the Fourdrinier fabric 22 (FIG. 2) via an opening 31, as shown by arrow 31a, in a suitable area of a side wall 12a or base 12b.

The space within the side walls 12a of testing device 10 is further divided into a still well 34 by another interior wall 36 positioned generally within the collection well 16. The still well 34 is in liquid communication with the collection well 16 by means of an opening 38 in interior wall 36. This opening 38 must be positioned substantially below the level of the opening means 30 in weir plate 14. The level of the liquid in still well 34 will then substantially always conform to the level of the liquid in the collection well 16. The opening 38 between the two wells 34 and 16 must be small enough that very little if any turbulence will be introduced into the still well, but large enough that the levels of liquid in the two wells do substantially correspond.

According to the invention, means are provided for sensing the level of the liquid in still well 34. In the preferred embodiment, this sensing means comprises an ultrasonic proximity sensor 40 which senses the proximity of the top level of the liquid in the still well 34 to the sensor and generates a signal based thereon. This signal is sent to an indicator 42 which includes means for calculating the actual flow rate, in units such as gallons per minute, based on the level of the liquid level in the still well. This flow rate is then displayed as a number by the indicator 42.

The purpose of providing different sizes of pickups 20, as indicated above, is to bring the flow rate of liquid within the device within the range of displayable values of the indicator 42 and the device 10 in general. As a further means to grossly adjust the flow to be measured, the weir plate 14 may be provided with a window 44 which is removable and replaceable, and which includes a window opening 46. Different windows 44 may have different window openings 46, causing different liquid levels in the collection well 16, and hence in the still well 34, for the same amount of liquid being collected by a given size of pick-up 20, and hence the same rate of flow. The indicator 42 is designed to be adjustable so as to take into account the size of the pickup 20 and the size of the window opening 46 in arriving at the displayed flow rate.

Further baffle means, such as a baffle 48 positioned just over the liquid inlet opening 16a, may be provided to further reduce liquid turbulence caused by the rushing in of the liquid from the pickup 20.

While the apparatus hereinbefore described is effectively adapted to fulfill the aforesaid objects, it is to be understood that the invention is not intended to be limited to the specific preferred embodiment of flow meter for liquid doctored from the wet end of a Fourdrinier-type paper machine set forth above. Rather, it is to be taken as including all reasonable equivalents within the scope of the following claims.

I claim:

1. A testing device for determining the amount of liquid having been doctored from the pulp at the wet end of a Fourdrinier-type paper machine by foil blades having leading and trailing edges, comprising:

pick-up means positioned beneath the foil blades of said paper machine, having an opening therein positioned beneath said leading edge of one of said foil blades for collecting some of the liquid being doctored from the pulp, said pick-up means having an opening for catching the liquid being doctored through said Fourdrinier fabric, including means for changing the size of the opening;

a container in liquid communication with said pick-up means;

a weir positioned within said container to divide said container into a collection well upstream from said weir and a discharge well downstream from said weir;

a still well positioned in liquid communication with said collection well; and sensing means positioned with respect to said still well to sense the level of liquid in said still well.

2. A testing device as recited in claim 1 further comprising microprocessor controlled display means for receiving a signal from said sensing means and displaying a flow rate based on the level of said liquid in said still well.

3. A testing device as recited in claim 1 or claim 2 further comprising return means in liquid communication with said discharge well and the area of said paper machine beneath the foil blades, for returning the liquid to said area after use in the device.

4. A testing device as recited in claim 1 or claim 2 further comprising baffle means positioned within said collection well for reducing agitation of said liquid caused by said liquid entering said collection well at a high rate of flow.

5. A testing device as recited in claim 2 wherein said sensing means includes an ultrasonic proximity sensor positioned proximal to the top of said still well for sensing the level of liquid within said still well and sending a signal indicating said level to said display means.

6. A testing device as recited in claim 1 or claim 2 wherein said weir includes means for adjusting the size and shape of the opening provided thereby.

7. A testing device as recited in claim 1 wherein said size-changing means includes means for permitting the substitution of different pickups, each having a different size opening.

8. A method for determining the amount of liquid having been doctored from the pulp through the Fourdrinier fabric at the wet end of a Fourdrinier-type paper machine, comprising:
  A. providing an weir-type flow meter including:
    1) a container;
    2) a weir positioned within said container to divide said container into a collection well and a discharge well downstream from said weir, said weir having an adjustable opening therein by which said liquid is permitted to pass between said collection well and said discharge well;
    3) a still well in liquid communication with said collection well such that the level of liquid in said still well matches the level of liquid in said collection well;
    4) sensing means positioned with respect to said still well to sense the level of liquid in said still well above said opening in said weir; and
    5) pick-up means for collecting some of the liquid being doctored from the pulp, and having different openings available for catching different amounts of the liquid being doctored through said fabric;
  B. selecting the pickup means having the proper size opening considering the position along the fabric where the determination is desired;
  C. inserting said chosen pickup means under said fabric at said position;
  D. choosing the proper size window opening so as to result in an actual flow rate within the limits of the container; and
  E. directing the flow of liquid from said pickup means to said container.

* * * * *